United States Patent
Lin et al.

(10) Patent No.: US 8,663,381 B2
(45) Date of Patent: Mar. 4, 2014

(54) METHOD FOR DISPERSING PIGMENT IN SOLVENT

(75) Inventors: Jiang-Jen Lin, Taipei (TW); Yi-Fen Lan, Taipei (TW); Yen-Chi Hsu, Taipei (TW)

(73) Assignee: National Taiwan University, Taipei (TW)

( * ) Notice: Subject to any disclaimer, the term of this patent is extended or adjusted under 35 U.S.C. 154(b) by 1074 days.

(21) Appl. No.: 12/218,871

(22) Filed: Jul. 18, 2008

(65) Prior Publication Data

US 2009/0145333 A1    Jun. 11, 2009

(30) Foreign Application Priority Data

Dec. 7, 2007  (TW) .............................. 96146921 A

(51) Int. Cl.
    *C04B 14/04*     (2006.01)
(52) U.S. Cl.
    USPC .......................................... 106/487; 106/486
(58) Field of Classification Search
    USPC ................................................. 106/486, 487
    See application file for complete search history.

(56) References Cited

U.S. PATENT DOCUMENTS

| | | | | |
|---|---|---|---|---|
| 3,577,254 A | * | 5/1971 | Petke | 106/400 |
| 3,577,255 A | * | 5/1971 | Petke | 106/400 |
| 3,993,500 A | * | 11/1976 | Isaac et al. | 106/465 |
| 6,486,254 B1 | * | 11/2002 | Barbee et al. | 524/445 |
| 2004/0082698 A1 | * | 4/2004 | Barbee et al. | 524/445 |
| 2004/0097630 A1 | * | 5/2004 | Whitman et al. | 524/445 |
| 2004/0235985 A1 | * | 11/2004 | Ichimura et al. | 106/494 |
| 2005/0271609 A1 | * | 12/2005 | Fei et al. | 424/65 |

FOREIGN PATENT DOCUMENTS

JP          2007197490 A  *  8/2007

* cited by examiner

*Primary Examiner* — Kaj K Olsen
*Assistant Examiner* — Ross J Christie
(74) *Attorney, Agent, or Firm* — PAI Patent & Trademark Law Firm; Chao-Chang David Pai

(57) ABSTRACT

A pigment is dispersed in a solvent by mixing the pigment nanoparticles with clay in a layered or platelet form and mixing the resultant mixture with the solvent. The method is based on geometric inhomogeneity and mutually exclusive aggregation. The layered or platelet clay having a high aspect ratio is provided to hinder aggregation of the pigment nanoparticles. The pigment nanoparticles can be stably dispersed in a matrix containing an organic solvent and water without aggregation again.

12 Claims, 5 Drawing Sheets
(3 of 5 Drawing Sheet(s) Filed in Color)

(A)

(B)

METHOD FOR DISPERSING PIGMENT IN SOLVENT

BACKGROUND OF THE INVENTION

1. Field of the Invention

The present invention relates to a method for dispersing a pigment in a solvent, which is suitable for applications to color filter, RGB pigment paste, inject ink, display, printing on paper, painting on vehicles or furniture, etc.

2. Description of the Prior Art

Most pigments are rigid conjugated-small molecules. Such molecules are usually hard to disperse due to van der Waals force and $\pi$-$\pi$ stacking. Therefore, it's a common issue in applications of pigments how to stably and uniformly disperse the pigments in solvents. Currently, two major solutions are:

(a) Modifying Surface Properties of the Pigments

Through a chemical process, pigment particles can be modified by grafting specific molecules on surfaces of the pigment particles. Such molecules generally have good affinity to solvents, whereby attraction between the pigment particles can be reduced. Thus the modified pigment particles can perform better in terms of dispersibility, paintability, miscibility with the solvent, etc. However, such modification process occurring between a solid phase and a liquid phase normally requires longer reaction time and has a lower conversion rate, which does not facilitate commercialization.

(b) Adding a Dispersant

By adding a dispersant in a proper solvent accompanied with mechanical agitating, coagulated pigment particles can be re-dispersed in the solvent. Different from the above modification process involving covalent bonding, only van der Waals force occurs between the dispersant and the pigment particles. Therefore, it's important but difficult to design a proper dispersant depending on the solvent system and surface features of the pigment particles, when considering the balance between particle-particle interaction and particle-solvent interaction. Such dispersant has to be easily adsorbed on surfaces of the pigment particles for them to be well dispersed.

To improve the above disadvantages, the present invention provides a physical method for dispersing a pigment in a solvent, in which layered or platelet clay is used to separate the pigment particles due to their geometric inhomogeneity or mutually exclusive aggregation.

SUMMARY OF THE INVENTION

An object of the present invention is to provide a simple method for dispersing a pigment in a solvent without complicated surface modification aforementioned.

Another object of the present invention is to provide a method for dispersing a pigment in a solvent, so that the pigment can be stably dispersed in a hydrophilic or hydrophobic solvent.

A further object of the present invention is to provide a method for dispersing a pigment in a solvent, whereby original structure of the pigment can be maintained in the dispersion without destruction.

To achieve the above objects, the method of the present invention comprises mixing a pigment in a nanoscale with a clay to obtain a mixture and mixing the resultant mixture in a solvent, wherein the clay is an ionic clay in the form of layers or platelets.

Preferably, the pigment and the clay have a weight ratio ($\alpha$) of about 0.3~5.

In the present invention, the pigment is not limited to any particular type and can be an azo pigment, a cyanine pigment or any other proper pigment. For example, a mono-azo pigment of the $\beta$-naphtol series, a mono-azo pigment of the naphtol AS series, a mono-azo pigment of the benzimidazolon series, a bis-azo pigment of the benzimidazolon series, a bis-azo pigment of the ketone series, phthalocyanine blue, phthalo blue or cyanine blue pigment.

The above clay can be a natural or a synthetic clay, for example, layered silicate clay such as natural sodium ionic montmorillonite ($Na^+$-MMT), synthetic mica, synthetic layered double hydroxide (LDH), bentonite and other synthetic silicates.

The abovementioned solvent is preferably propylene glycol monomethyl ether acetate (PGMEA), ethanol, isopropyl alcohol (IPA), acetone, methyl ethyl ketone (MEK), tetrahydrofuran (THF), toluene, dimethy formamide (DMF) or dimethyl acetamide (DMAC).

In the present invention, the pigment and the clay can be mixed by means of polishing, rolling, pounding, mechanical agitating or any other proper mechanism. The pigment and the clay can be dispersed in the solvent by means of polishing, mechanical agitating, ultrasonic vibration or any other proper mechanism. In the solvent, the pigment and the clay preferably have a solid content of about 0.1~10 wt. %.

BRIEF DESCRIPTION OF THE DRAWINGS

The patent or application file contains at least one drawing executed in color. Copies of this patent or patent publication with color drawings will be provided by the Office upon request and payment of the necessary fee.

DETAILED DESCRIPTION OF THE PREFERRED EMBODIMENTS

Figure 1:
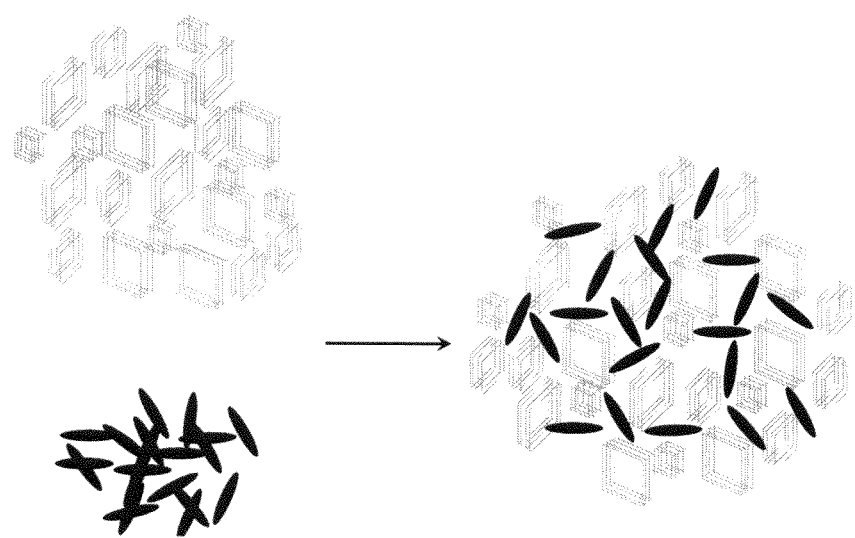
FIG. 1 shows the mechanism for dispersing the pigment particles with inorganic layered clay.

In the present invention, a physical dispersion process for dispersing pigments is applied according to geometric differences of the materials, in which inorganic layered silicate clay serves as a dispersant so as to avoid destruction to the structure of the pigments and influences of organic dispersant on applications of the pigments. The mechanism for inorganic layered clay dispersing pigment particles involves great differences in geometric features and hydrophilicity or hydrophobicity, as shown in FIG. 1.

The materials used in the preferred embodiments (Examples) of the present invention include:

1. Pigments: product of Ciba and BASF, including green pigment G36, red pigment R254, CI pigment blue, Yellow 83, CI pigment Violet.
2. Synthetic Mica: product of CO-OP Chemical Co., produced by heating talc and $Na_2SiF_6$ in an electric furnace for several hours, capable of being swollen, having a cationic exchange capacity (CEC) 120 meq/100 g, comprised of Si (26.5 wt %), Mg (25.6 wt %), Al (0.2 wt %), Na (4.1 wt %), Fe (0.1 wt %), F (8.8 wt %), size of the primary structure=300× 300×1 nm.
3. Propylene glycol monomethyl ether acetate: PGMEA, product of Aldrich Chemical Co.

Example 1

By polishing with a ball miller (1 mm zirconium beads, hereinafter the same), the synthetic mica (3 mg) and the green pigment (3 mg) are well mixed to obtain a green pigment-synthetic mica (G-mica) hybrid with a weight ratio of mica/pigment ($\alpha$)=1, as listed in Table 1.

Example 2

Repeat the procedure of Example 1, but the green pigment is replaced with the red pigment to obtain a red pigment-synthetic mica (R-mica) hybrid.

Examples 3~5

Repeat the procedure of Example 2, but the weight ratio of clay/pigment ($\alpha$) are changed as those listed in Table 1.

Example 6

Repeat the procedure of Example 1, but the green pigment is replaced with the blue pigment to obtain a blue pigment-synthetic mica (B-mica) hybrid.

Examples 7~9

Repeat the procedure of Example 6, but the weight ratio of clay/pigment ($\alpha$) are changed as those listed in Table 1.

Example 10

Repeat the procedure of Example 1, but the green pigment is replaced with the yellow pigment to obtain a yellow pigment-synthetic mica (Y-mica) hybrid.

Example 11

Repeat the procedure of Example 1, but the green pigment is replaced with the violet pigment to obtain a violet pigment-synthetic mica (V-mica) hybrid.

TABLE 1

| Example | Pigment | Weight ratio of clay/pigment ($\alpha$) | Hybrid |
|---|---|---|---|
| 1 | green | 1.0 | G-mica |
| 2 | red | 1.0 | R-mica |
| 3 | red | 0.5 | R-mica |
| 4 | red | 2.0 | R-mica |
| 5 | red | 3.0 | R-mica |
| 6 | blue | 1.0 | B-mica |
| 7 | blue | 0.5 | B-mica |
| 8 | blue | 2.0 | B-mica |
| 9 | blue | 3.0 | B-mica |
| 10 | yellow | 1.0 | Y-mica |
| 11 | violet | 1.0 | V-mica |

Tests for Dispersibility of Pigments

1. Dispersion of Pigments in Water (Control Experiments)

The raw red pigment (1 mg) and the green pigment (1 mg) are respectively added into water (5 g). Poor dispersibility is observed for the both red and green pigments, which immediately settle on the bottom, as shown in bottles (A) of FIGS. 2 and 3.

Figure 2:
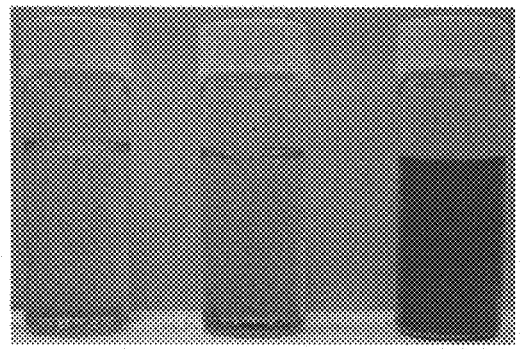
FIG. 2 compares dispersibility of the green pigment in water, wherein (A) shows the unpolished pigment, (B) shows the polished pigment, and (C) shows the polished pigment accompanied with a dispersant of the present application.
Figure 3:
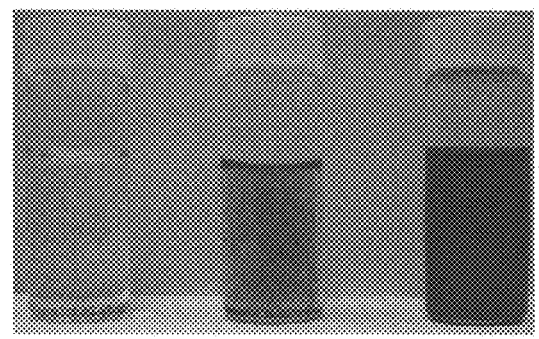
FIG. 3 compares dispersibility of the red pigment in water, wherein (A) shows the unpolished pigment, (B) shows the polished pigment, and (C) shows the polished pigment accompanied with a dispersant of the present application.

Even though the red pigment and the green pigment are polished, the pigments still aggregate and can not be dispersed well in water, as shown in bottles (B) of FIGS. 2 and 3.

2. Dispersion of Pigments in Water with Mica

The G-mica hybrid (2 mg, $\alpha$=1) and the R-mica hybrid (2 mg, $\alpha$=1) of Examples 1 and 2 are respectively added into water (5 g), and the results are compared with those with the raw pigments and the polished pigments. Bottles (C) of FIGS. 2 and 3 show the results, and both are uniformly dispersed. As the polishing process provides mechanical shear stress to reduce sizes of the pigment particles, more surface area thereof can contact with mica. Therefore, aggregation of the green and red pigments is significantly reduced.

3. Dispersion of Pigments in Water with Different Mica Content

Figure 4:
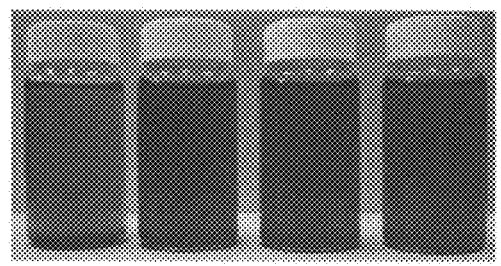
FIG. 4 shows dispersions of the hybrids including blue pigment and different amounts of mica in water.
Figure 5:
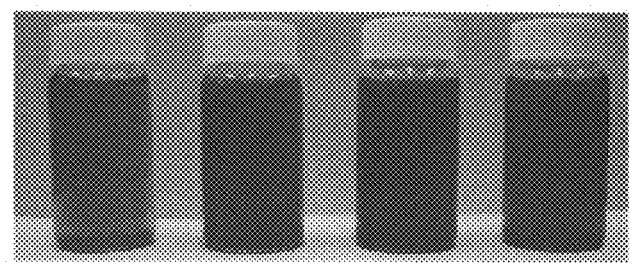
FIG. 5 shows dispersions of the hybrids including red pigment and different amounts of mica in water.

The hybrids (each 1 mg) of Examples 2~9 are respectively added into water (20 g). FIGS. 4 and 5 respectively show dispersions of the B-mica hybrid and the R-mica hybrid, and weight ratios of mica/pigment are 0.5, 1, 2 and 3, from left to right. As shown in FIGS. 4 and 5, dispersibility of the pigments increases with the mica content, i.e., the effect of geometric dispersion relates to the pigment/mica ratio.

Figure 6:
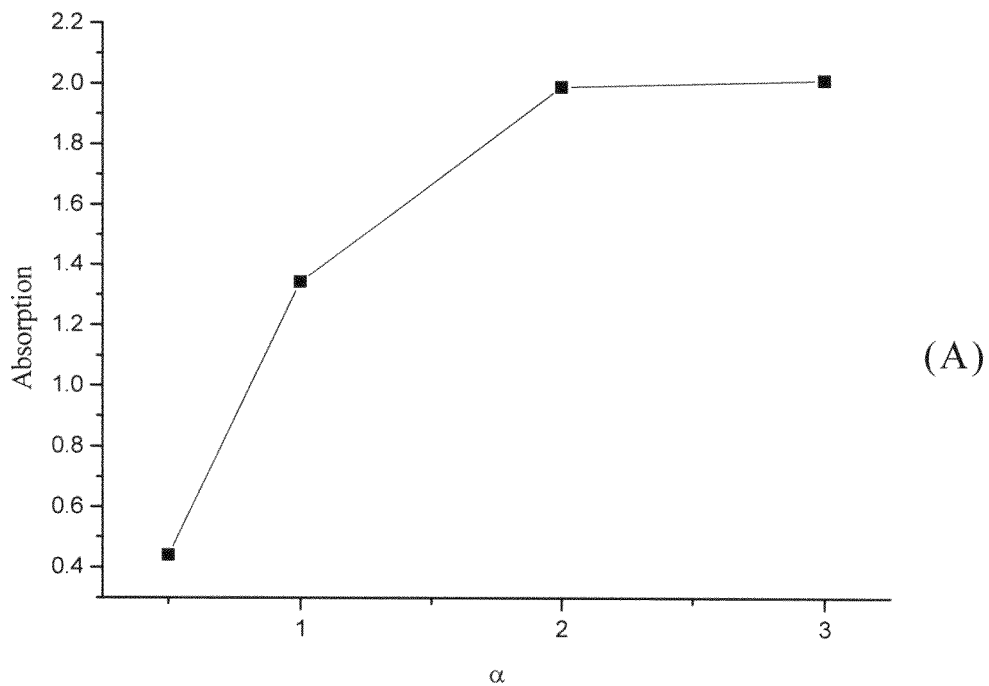
FIG. 6 shows the relationship between the weight ratios of mica/pigment ($\alpha$) and the UV-vis absorbance.
Figure 6:
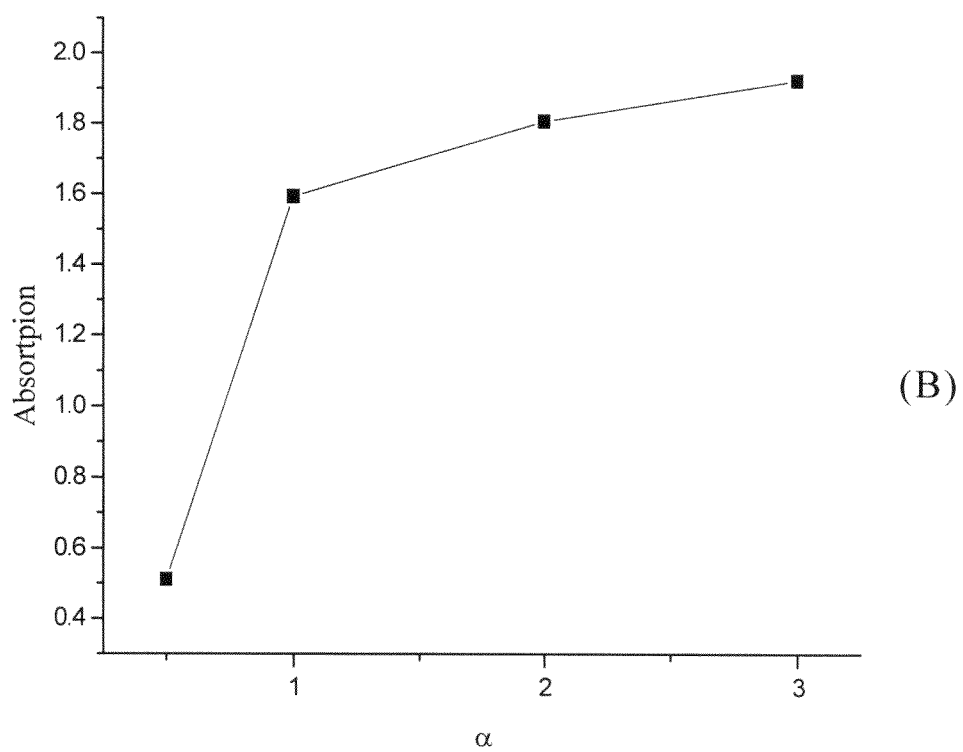

The dispersions are also analyzed with UV-vis spectrum. As shown in FIG. 6, UV-vis absorbance or dispersibility of the pigment in water increases with $\alpha$, for both of the red and blue pigments. Graph (A) shows UV-vis absorbance of the B-mica hybrid having different $\alpha$ at $\lambda$=360 nm; and graph (B) shows UV-vis absorbance of the R-mica hybrid having different $\alpha$ at $\lambda$=565 nm.

4. Dispersions of Pigments in Organic Solvents

Figure 7:
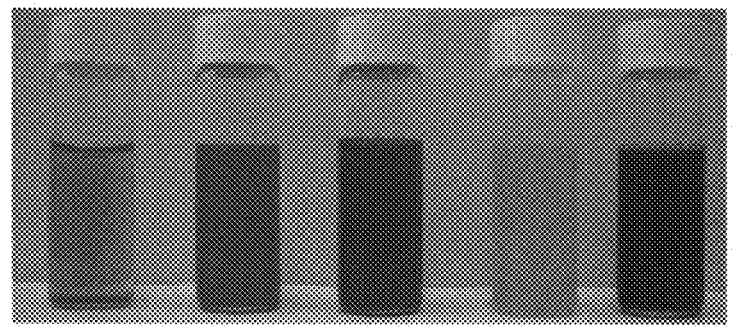
FIG. 7 shows dispersions of the hybrids including mica and different pigments in water.
Figure 8:
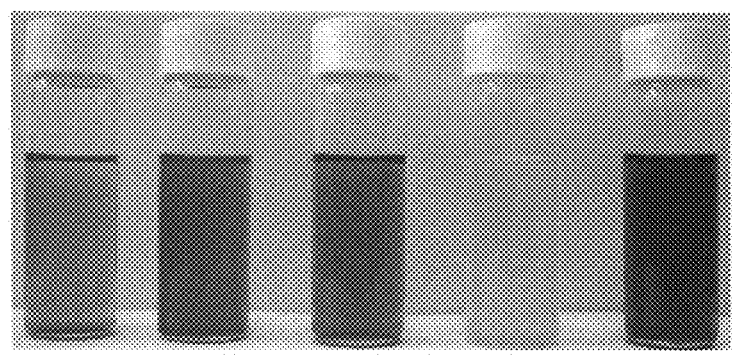
FIG. 8 shows dispersions of the hybrids including mica and different pigments in PGMEA.

For the hybrids (G-mica, R-mica, B-mica, Y-mica and V-mica; each 1 mg, $\alpha$=1) of Examples 1, 2, 6, 10 and 11, dispersions thereof in water (5 g) and PGMEA (5 g) are compared and shown in FIGS. 7 and 8, respectively.

Similarly, each of the hybrids (R-mica, B-mica; each 1 mg, $\alpha$=1) of Examples 2 and 6 are added into water (10 g) and different organic solvents (PGMEA, ethanol, toluene; each 10 g), and then uniformly dispersed in all solvents. After 30 minutes, the dispersions in water and PGMEA are separated into two phases and begin precipitating. That is, the mica can effectively help disperse the pigments in different solvents.

What is claimed is:

1. A method for dispersing a pigment in a solvent, comprising: mixing the pigment nanoparticles only with a clay to obtain a physical dispersion without the presence of a solvent, and mixing the physical dispersion with the solvent to be dispersed in the solvent, wherein the clay is an ionic clay in the form of layers or platelets.

2. The method as claimed in claim 1, wherein the pigment and the clay have a weight ratio ($\alpha$) of 0.3~5.

3. The method as claimed in claim 1, wherein the pigment is an azo pigment or a cyanine blue pigment.

4. The method as claimed in claim 1, wherein the pigment is a mono-azo pigment of the β-naphtol series, a mono-azo pigment of the naphtol AS series, a mono-azo pigment of the benzimidazolon series, a bis-azo pigment of the benzimidazolon series, or a bis-azo pigment of the ketone series.

5. The method as claimed in claim 1, wherein the pigment is a phthalocyanine blue pigment, a phthalo blue pigment or a cyanine blue pigment.

6. The method as claimed in claim 1, wherein the clay is natural clay or synthetic clay.

7. The method as claimed in claim 1, wherein the clay is layered silicate clay.

8. The method as claimed in claim 7, wherein the clay is natural sodium ionic montmorillonite ($Na^+$-MMT), synthetic mica, synthetic layered double hydroxide (LDH), bentonite or synthetic clay.

9. The method as claimed in claim 1, wherein the solvent is water, propylene glycol monomethyl ether acetate (PG-MEA), ethanol, isopropyl alcohol (IPA), acetone, methyl ethyl ketone (MEK), tetrahydrofuran (THF), toluene, dimethyl formamide (DMF) or dimethyl acetamide (DMAC).

10. The method as claimed in claim 1, wherein the pigment and the clay are mixed by means of polishing, rolling, pounding or mechanical agitating.

11. The method as claimed in claim 1, wherein the physical dispersion of the pigment and the clay is dispersed in the solvent by means of polishing, mechanical agitating or ultrasonic vibration.

12. The method as claimed in claim 1, wherein the pigment and the clay in the solvent have a solid content of 0.1~10 wt. %.

* * * * *